United States Patent
Lai

(10) Patent No.: US 7,324,018 B2
(45) Date of Patent: Jan. 29, 2008

(54) PRESS KEY STRUCTURE

(75) Inventor: Kun-Hui Lai, Taipei (TW)

(73) Assignee: Inventec Corporation, Taipei (TW)

( * ) Notice: Subject to any disclaimer, the term of this patent is extended or adjusted under 35 U.S.C. 154(b) by 224 days.

(21) Appl. No.: 11/334,377

(22) Filed: Jan. 19, 2006

(65) Prior Publication Data

US 2007/0172288 A1     Jul. 26, 2007

(51) Int. Cl.
 *H03M 11/00* (2006.01)
(52) U.S. Cl. .................. 341/20; 400/479; 361/680; 200/50.02
(58) Field of Classification Search ............ 341/20, 341/22; 400/479; 361/680; 200/50.02
See application file for complete search history.

(56) References Cited

U.S. PATENT DOCUMENTS

| 3,831,063 | A | * | 8/1974 | Keough | ............. | 361/680 |
| 4,274,752 | A | * | 6/1981 | Huber et al. | ............. | 341/33 |
| 4,675,787 | A | * | 6/1987 | Suwa | ............. | 361/680 |
| 5,455,746 | A | * | 10/1995 | Sato et al. | ............. | 361/816 |
| 6,172,867 | B1 | * | 1/2001 | Satou et al. | ............. | 361/680 |

* cited by examiner

*Primary Examiner*—Albert K. Wong
(74) *Attorney, Agent, or Firm*—Bacon & Thomas, PLLC

(57) ABSTRACT

A press key structure comprises two first plates disposed between a casing and a circuit board, wherein one side of each first plate is exposed to the outside of the casing, the other side thereof faces the circuit board and includes a groove, and each of the grooves includes a trigger module disposed at the position corresponding to a first triggering portion on the circuit board, and a second plate includes a pressing portion and two elastic connecting portions, wherein the elastic connecting portions are disposed at two ends of the pressing portion at the positions corresponding to the two first plates respectively, a surface of the pressing portion is exposed to the outside of the casing, the other surface thereof faces a second triggering portion on the circuit board, and the two elastic connecting portions are respectively accommodated in the grooves so as to place the pressing portion at the position between the two first plates and extend the other ends of the elastic connecting portions out from the grooves.

7 Claims, 5 Drawing Sheets

PRESS KEY STRUCTURE

FIELD OF THE INVENTION

The present invention relates to a press key structure, and more particularly to a press key structure with a thin and small design.

BACKGROUND OF THE INVENTION

In various present handheld electronic devices and communication equipments (such as mobile phones, personal digital assistants, and palmtop computers, etc), a notebook computer is an important item among these electronic information products. As the annual demand of the information market keeps growing, and various information products are developed and advanced rapidly, the research and development concept for related electronic products tends to be designed with a high-frequency and high-speed data processing mode and comes with light, thin, short, and compact features. To minimize the size of the information products, the chips inside the information device are miniaturized gradually, but such miniaturization does not imply reducing the functions of the products. On the contrary, the add-on values and functions of these electronic products are improved according to consumer requirements.

Since the circuit design of computers at early stage is simpler, its application programs are fewer, and its operating speed is slower, therefore there exists no problem in the related model designs, electronic components and layouts. However, manufacturers have to add many electronic components and chips in a smaller main system now, and thus design engineers have to fit many components in very limited space and cannot afford wasting any space. Thus, finding a way to further reduce the volume of each electronic component and each hardware component in the very narrow and small space and add extra functions and components to satisfy consumer requirements has become a big issue to major electronic manufacturers and also has become a key factor to determine the success of a particular manufacturer.

Referring to FIGS. 1 and 2 for the prior art direction key structure installed on a notebook computer, the direction key structure is disposed between the surface of a casing and a circuit board 1, and the direction key structure comprises a first pressing member 2 and two second pressing members 3. The two second pressing members 3 are arranged separately on both sides of the first pressing member 2, and a surface of the pressing member 2, 3 faces exterior of the casing to allow users to press the pressing member 2, 3, and another surface faces the circuit board 1. The first pressing member 2 includes a groove 20, a plurality of protruding pillars 200, and two suspending arms 22. The groove 20 is disposed on another surface of the first pressing member 2, and an end of the protruding pillar 200 is disposed on the bottom surface of the groove 20 and arranged in the up, down, left, and right sides and disposed on both sides and both ends adjacent to the first pressing member 2, and another end faces a plurality of contact points 10 on the circuit board 1. An end of each of the two suspending arms 22 is disposed separately on another surface of the connecting position of the first pressing member 2, and another end of each suspending arm 22 is extended out of both sides of the first pressing member 2 and keeps a first interval A from another surface of the two second pressing members 3 and a second interval B from the circuit board 1. An end of each of the two suspending arms 22 is coupled to an internal surface of the casing, such that the elasticity of the two suspending arms 22 drives another end of the protruding pillar 200 to press the contact points 10, when the first pressing member 2 is pressed separately in the up, down, left, and right sides, so as to input instructions for moving the cursor in different directions for the notebook computer.

In FIGS. 1 and 2, the second pressing member 3 includes another groove 30, another protruding pillar 300, and a supporting stand 32, wherein the other groove 30 is disposed on another surface of the second pressing member 3, and an end of the other protruding pillar 300 is disposed on the bottom surface of the other groove 30, and another end of the other protruding pillar 30 is extended into a hollow space of the suspending arm 22, and another end of the other protruding pillar 300 faces a plurality of other contact points 12 on the circuit board 1, and the other contact points 12 maintain the second interval B apart, and an end of the supporting stand 32 is coupled to a side of the second pressing member 3, and another end is fixed into the casing. The supporting stand 32 on the surface of the second pressing member 3 faces the exterior of the casing, such that if the second pressing member 3 is pressed, another end of the other protruding pillar 300 will press the other contact points 12 for controlling the notebook computer.

Although the direction key structure is installed by a stacking method according to the foregoing structure, the first interval A must be greater than the second interval B in order to prevent another surface of the second pressing member 3 from touching the suspending arm 22, when another surface of the second pressing member 3 is pressed, so as to prevent the first pressing member 2 from being pushed by the second pressing member 3 that will press the contact points 10. However, such arrangement may greatly increase the thickness of the direction key structure, as shown in FIG. 2, which includes the thicknesses of the second pressing member 3, the first interval A, the thickness of the suspending arm 22, and the second interval B. As a result, the space in the notebook computer has to accommodate the thickness of the direction key structure, not only wasting the internal space of a notebook computer, but also going against the trend of the light, thin, short, and compact design of the present electronic devices, which further increases the level of difficulty for miniaturizing the notebook computer.

SUMMARY OF THE INVENTION

In view of the shortcomings of the prior art direction key structure being too thick and occupying much space, the inventor of the present invention based on years of experience in the related industry to conduct extensive researches and experiments to overcome the shortcomings of the prior art by reducing the volume of the press key structure and the space for installing electronic devices, and finally invented a press key structure in accordance with the present invention.

Therefore, it is an objective of the present invention to provide a press key structure that comprises two first plates and a second plate, wherein the two first plates are disposed between a casing and a circuit board installed in the casing, and one side of each first plate is exposed outside of the casing, and the other side of each first plate faces the circuit board, and includes a groove, and each groove includes a trigger module disposed at a position corresponding to a first triggering portion on the circuit board. If the two first plates are pressed, the first triggering portion will be triggered for inputting signals. The second plate includes a pressing portion and two elastic connecting portions, and the pressing portion is disposed at a corresponding end of one of the first two plates, and a surface of the pressing portion is exposed to the outside of the casing, and another surface faces a second triggering portion on the circuit board. If the pressing portion is pressed, the second triggering portion will be pressed for inputting signals. The two elastic connecting portions are accommodated in the grooves, so as to face the pressing portion at the position between the two first plates, and extend the other end of the elastic connecting portions out from the groove, so as to reduce the thickness of the stacked press key structure.

The above and other objects, features and advantages of the present invention will become apparent from the following detailed description taken with the accompanying drawings.

DETAILED DESCRIPTION OF THE PREFERRED EMBODIMENTS

Figure 3:
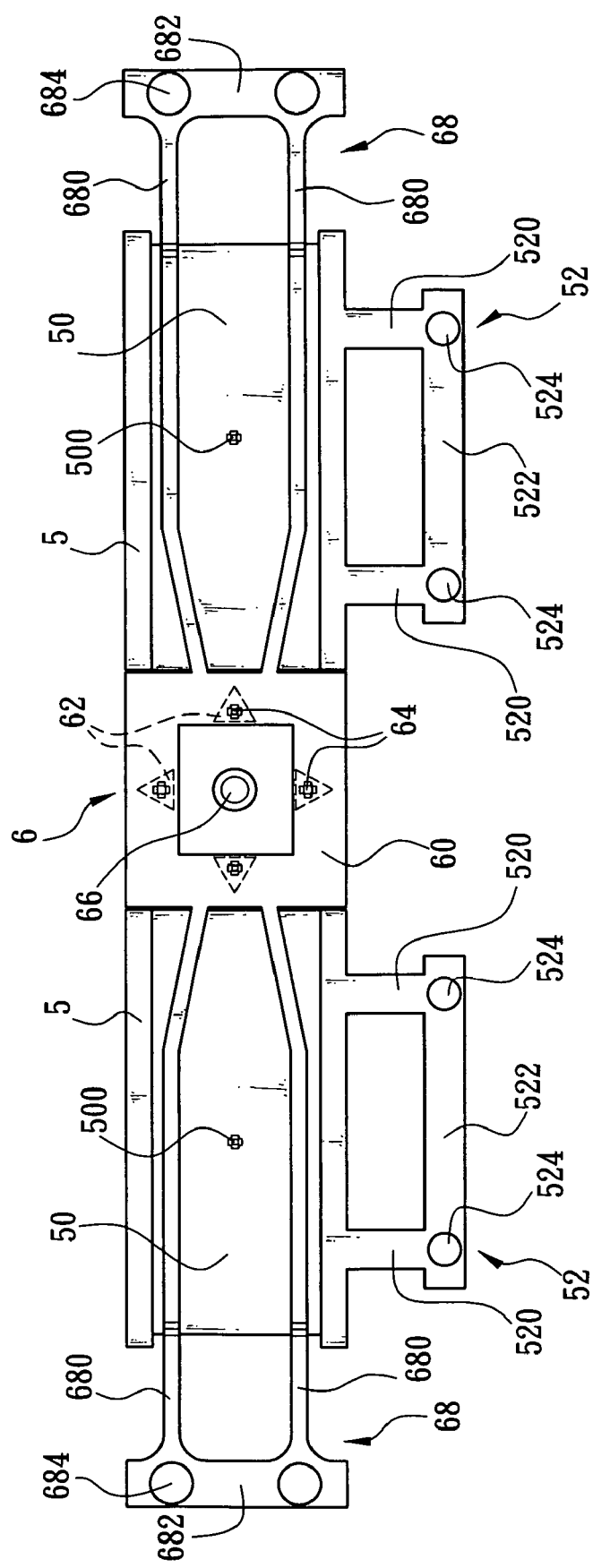
FIG. 3 is a schematic view of a press key structure of the invention.
Figure 4:
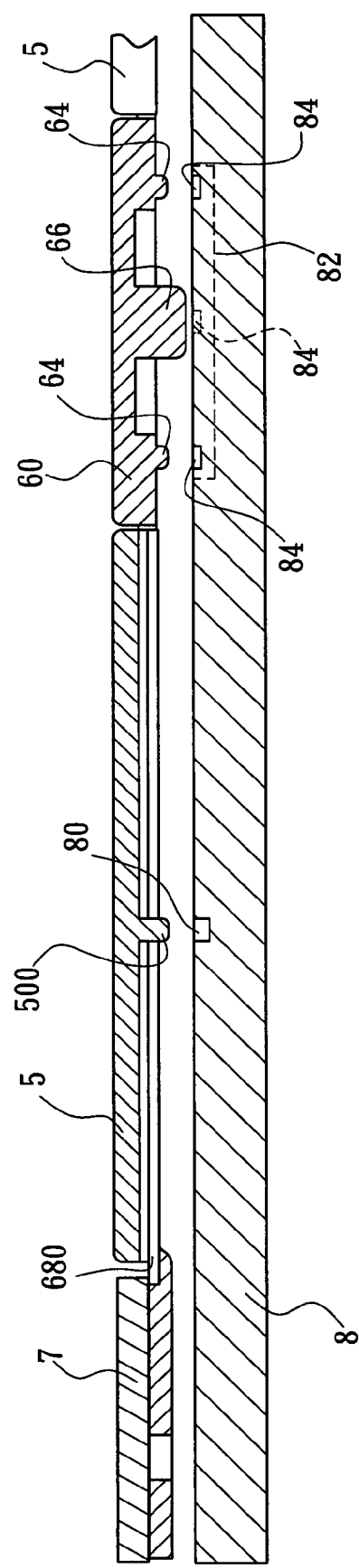
FIG. 4 is a cross-sectional view of a press key structure of the invention.

Referring to FIGS. 3 and 4 for the press key structure of the present invention, the press key structure comprises two first plates 5 and a second plate 6, wherein the two first plates 5 are disposed on a casing 7, and the casing 7 includes a circuit board 8 therein. A surface of the two first plates 5 is exposed to the outside of the casing 7 and allows users to press, and another surface faces the circuit board 8, and another surface of each first plate 5 includes a groove 50, and the groove 50 includes a trigger module 500, and the trigger module 500 precisely faces a first triggering portion 80 installed on the circuit board 8. The second plate 6 comprises a pressing portion 60 and two elastic connecting portions 68, and the pressing portion 60 is disposed at a corresponding end of each first plate 5. A surface of the pressing portion 60 is exposed to the outside of the casing 7 for users to press, and another surface faces a second triggering portion 82 installed on the circuit board 8, and the two elastic connecting portions 68 are accommodated in the grooves 50. An end of each elastic connecting portion 68 is disposed on the pressing portion 60 that faces both sides of the two first plates 5, and another end is extended out from the groove 50.

If the two first plates 5 of the press key structure of the invention are pressed, the first triggering portion 80 will be pressed by the trigger module 500 to input signals, and if the pressing portion 60 is pressed, then the pressing portion 60 will trigger the second triggering portion 82 to input signals. Since the pressing portion 60 is disposed between the two first plates 5, the two elastic connecting portions 68 can be accommodated in the grooves 50 to reduce the thickness of the stacked press key structure and greatly increase the available space in the casing 7.

Figure 5:
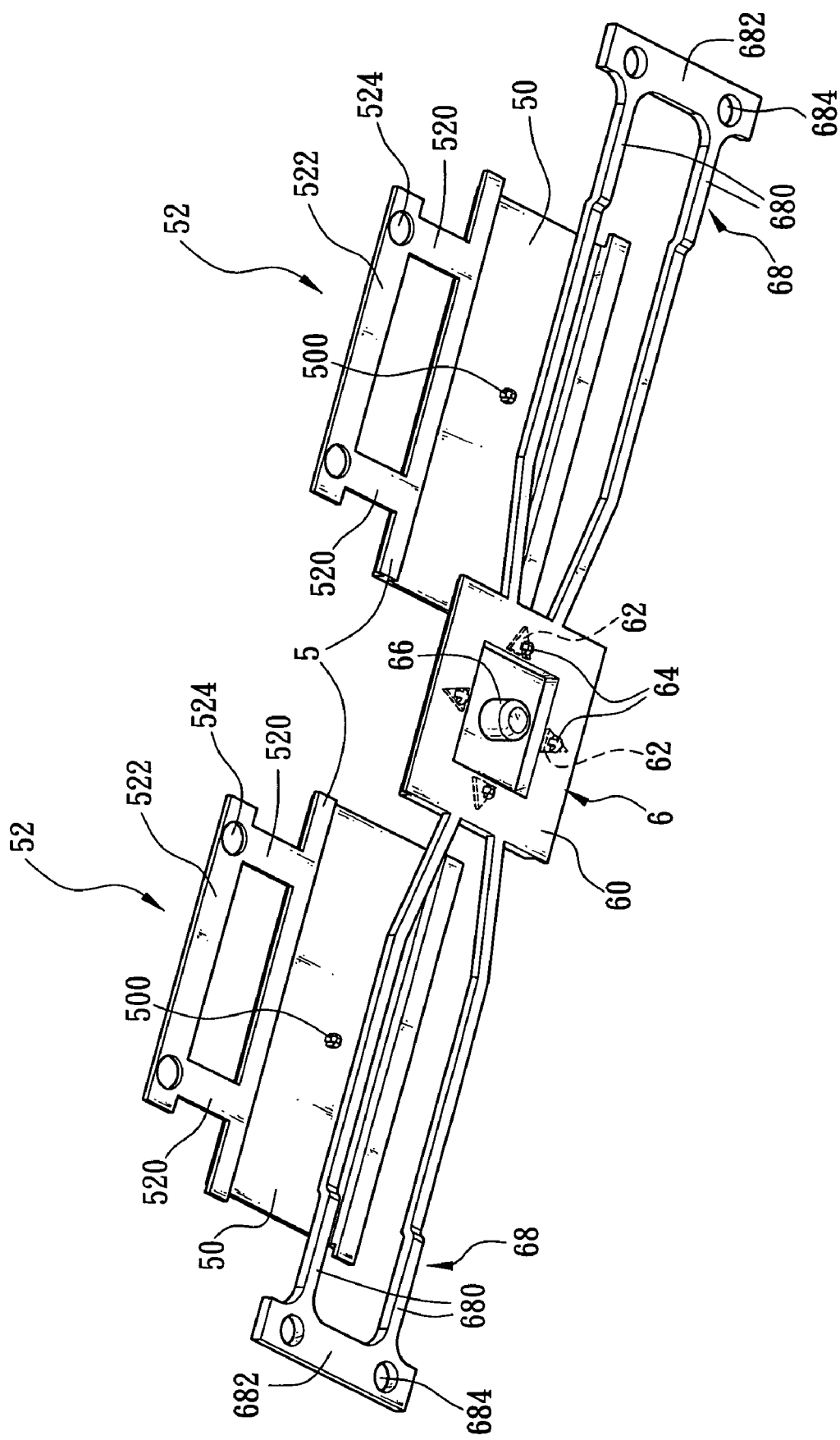
FIG. 5 is an exploded view of a press key structure of the invention.

In a preferred embodiment of the invention as shown in FIGS. 3 and 5, the elastic connecting portion 68 includes a plurality of suspending arms 680 and a connecting member 682, wherein the suspending arms 680 are accommodated in the grooves, and an end of each suspending arm 680 is coupled to the pressing member, and another end is extended out from the groove 50, such that the groove 50 can effectively reduce the thickness produced by stacking the two first plates 5 and the second plate 6, and the connecting member 682 is coupled to another end of each suspending arm 680. The connecting member 682 is fixed on the circuit board 8, and there is an interval between the suspending arms 680 and the pressing portion 60, such that the pressing portion 60 can be pressed and moved between the casing 7 and the circuit board 8 by the elasticity of the suspending arms 680. The space between the suspending arms 680 prevents the trigger module 500 from being interfered and gives a good contact with the first triggering portion 80 for inputting signals.

In the preferred embodiment as shown in FIGS. 3 and 5, the connecting member 682 further comprises a plurality of combining holes 684 for passing a fixing element, so that the connecting member 682 can be fixed onto the circuit board 8 by the fixing element.

Referring to FIGS. 3 and 4 for the preferred embodiment of the present invention, the pressing portion 60 includes a plurality of indicating symbols 62 and a plurality of second trigger modules 64, wherein the indicating symbols 62 are disposed on a surface of the pressing portion 60 and arranged in the up, down, left, and right directions and disposed adjacent to both sides and both ends of the pressing portion 60 for users to identify the desired input signal, and the second trigger module 64 is disposed on another surface of the pressing portion 60 corresponding to the indicating symbols 62 and separately facing a plurality of triggering points 84 of the second triggering portions 82. If one of the indicating symbols 62 on the pressing portion 60 is pressed, another end of the second trigger module 64 corresponding to the indicating symbol 62 will trigger the triggering point 84 for inputting signals.

In the preferred embedment as shown in FIGS. 3 and 4, the pressing portion 60 among the second trigger modules 64 further comprises a pillar 66, and an end of the pillar 66 is disposed on another surface of the pressing portion 60, and another end is movably disposed on the circuit board 8, and there is an interval between the second trigger module 64 and the circuit board 8, so that the pressing portion 60 is rotated by using the pillar 66 as a rotating axis. If one of the indicating symbols 62 on the pressing portion 60 is pressed, the second trigger module 64 corresponding to the indicating symbol 62 will approach the circuit board 8, and the other one of the second trigger modules 64 keeps an interval between the pillar 66 and the circuit board 8 to prevent triggering the rest of the triggering points 84. If the two first plates 5 are pressed to trigger the triggering portion 80, the pillar 66 can prevent the second trigger modules 64 from touching or triggering the triggering points 84.

In the preferred embodiment as shown in FIGS. 3 and 5, the two first plates 5 include a second elastic connecting portion 52, and the second elastic connecting portion 52 includes a plurality of second suspending arms 520 and a second connecting member 522, wherein an end of each of the second suspending arms 520 is disposed on a side of the first plate 5 and another end is coupled to the second connecting portion 52, and the second connecting member 522 is disposed on the circuit board 8, so that the two first plates 5 can be pressed by the elasticity of the second suspending arms 520 and moved between the casing 7 and the circuit board 8 for inputting signals.

In the preferred embodiment as shown in FIGS. 3 and 5, the second connecting member 522 further comprises a plurality of second combining holes 524 for passing a second fixing element, such that the second connecting member 522 can be fixed onto the circuit board 8 by the second fixing element.

Figure 1:
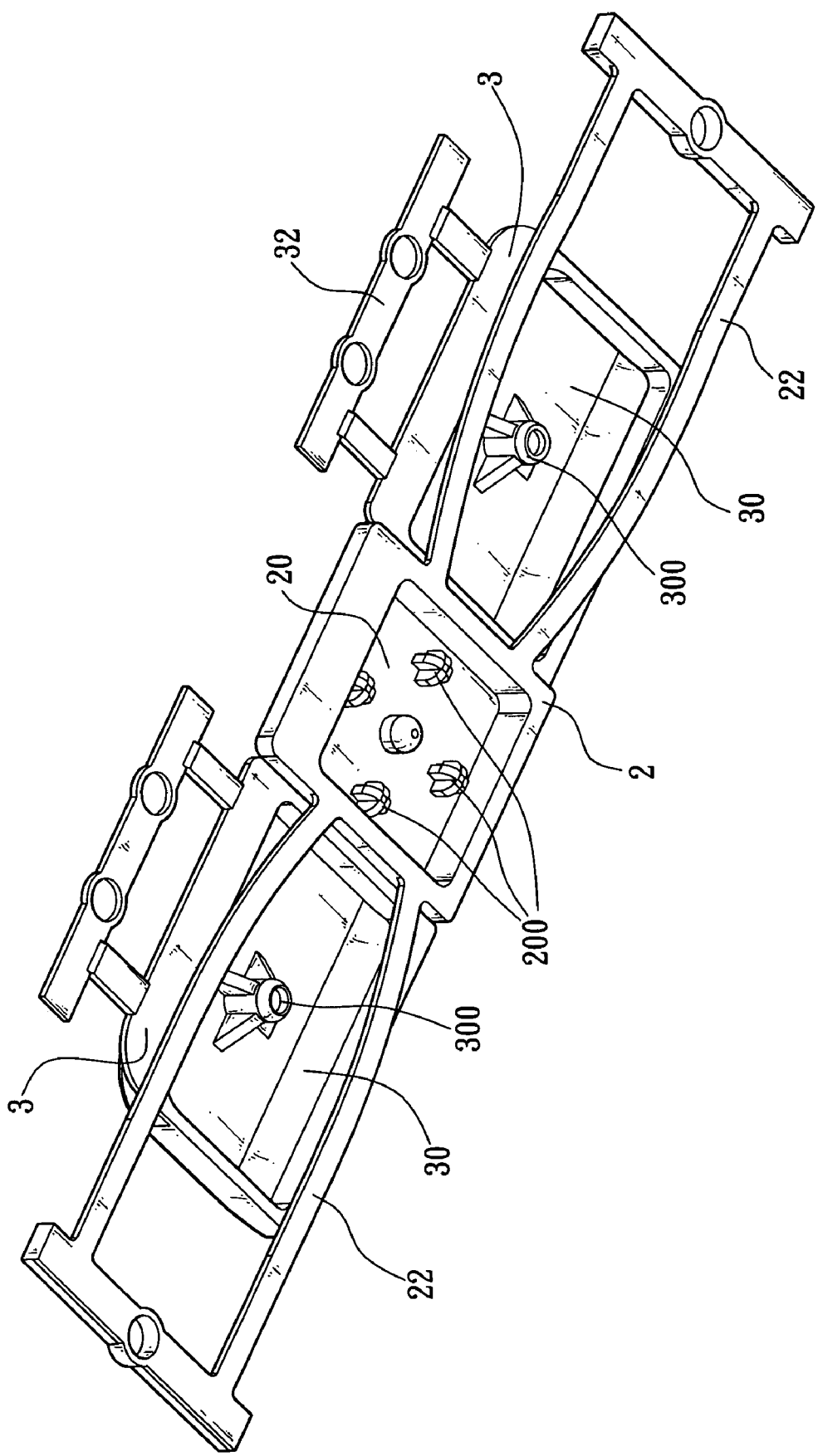
FIG. 1 is a schematic view of a prior art direction key structure.
Figure 2:
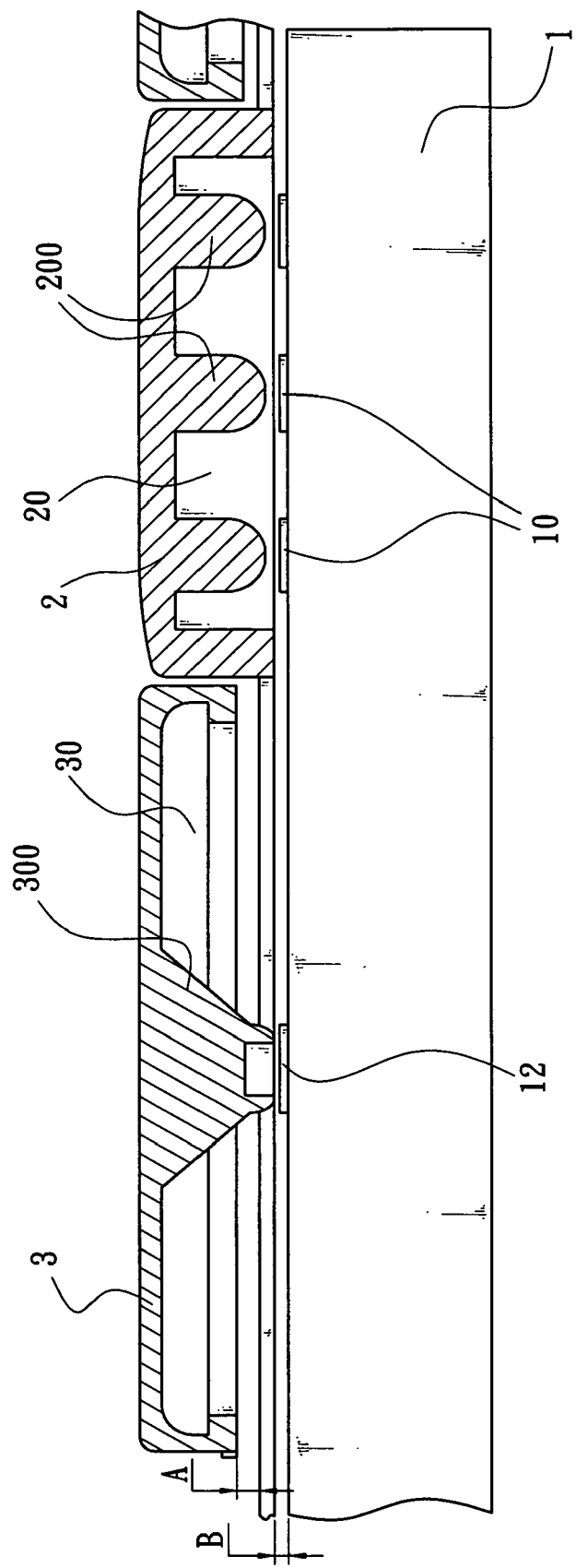
FIG. 2 is a cross-sectional view of a prior art direction key structure.

By the foregoing structure of the present invention, the thickness of the press key structure as shown in FIG. 5 only includes the thicknesses of the pressing portion 60 and the pillar 66. On the other hand, a prior art direction structure as shown in FIG. 2 has a thickness including the thickness of the second pressing member 3, the first interval A, the thickness of the suspending arm 22, and the second interval B. The first interval A and second interval B not only cause an increased thickness of the direction key structure, but also cause the thickness of each component to exceed the thickness of the two first plates 5 in order to meet the requirement of having the first interval A greater than the second interval B. With the increases on both component thickness and intervals between components, the light, thin, short, and compact features of the two first plates 5 and the second plates 6 of the present invention can be achieved significantly. The second plate 6 of the invention is disposed at a corresponding end of the two first plates 5, and the two elastic connecting portions 68 are accommodated in the two first plates 5 to greatly reduce the thickness, so that the press key structure of the invention can break through the unachievable thickness of the prior art direction key structure, so as to significantly save the internal space of the computers or electronic devices and greatly help miniaturizing the computers and electronic devices.

While the invention herein disclosed has been described by means of specific embodiments, numerous modifications and variations could be made thereto by those skilled in the art without departing from the scope and spirit of the invention set forth in the claims.

What is claimed is:

1. A press key structure, comprising:
   two first plates, disposed between a casing and a circuit board installed in said casing, wherein one side of said each first plate is exposed to the outside of said casing, the other side of said each first plate faces said circuit board and includes a groove, and said each groove includes a trigger module disposed at the position corresponding to a first triggering portion on said circuit board; and
   a second plate, including a pressing portion and two elastic connecting portions, wherein said elastic connecting portions are disposed at two ends of said pressing portion at the positions corresponding to said first plates respectively, and a surface of said pressing portion is exposed to the outside of said casing, and the other surface of said pressing portion faces a second triggering portion on said circuit board, and said two elastic connecting portions are respectively accommodated in said grooves so as to place said pressing portion at the position between said two first plates and extend the other ends of said elastic connecting portions out from said grooves.

2. The structure of claim 1, wherein said elastic connecting portion comprises:
   a plurality of suspending arms, accommodated in said groove, and an end of said suspending arm is coupled to said pressing member, and another end of said suspended arm is extended out from said groove; and
   a connecting member, coupled to another end of said suspending arm and disposed on said circuit board, and said suspending arm and said pressing portion have an interval apart from said circuit board.

3. The structure of claim 2, wherein said pressing portion comprises:
   a plurality of indicating symbols, disposed on a surface of said pressing portion and arranged in up, down, left and right directions adjacent to both lateral sides and both ends of said pressing portion respectively; and
   a plurality of other trigger modules, installed on another surface of said pressing portion and corresponding to said indicating symbols, and facing a plurality of triggering points of said other triggering portion.

4. The structure of claim 3, wherein said connecting member further includes a plurality of combining holes for fixing said connecting member onto said circuit board by a fixing element.

5. The structure of claim 4, wherein said pressing portion in said other trigger modules includes a pillar, and an end of said pillar is disposed on another surface of said pressing portion, and said other end is movably disposed on said circuit board, and said other trigger modules keep a distance from said circuit board.

6. The structure of claim 4, wherein said two plates separately include another elastic connecting portion, and said other elastic connecting portion comprises:
   a plurality of other suspending arms, and an end of said other suspending arm being disposed on a side of said plate; and
   another connecting member, coupled to another end of said other suspending arm and disposed on said circuit board.

7. The structure of claim 4, wherein said other connecting member further comprises a plurality of other combining holes for fixing said connecting member onto said circuit board by said other fixing element.

* * * * *